United States Patent [19]

Shurman

[11] 4,318,436

[45] Mar. 9, 1982

[54] TIRE SIDEWALL ADDITION MEMBERS THAT UNDERGO PERCEPTIBLE CHANGE DURING ABNORMAL OPERATION

[75] Inventor: Louis W. Shurman, Canton, Ohio

[73] Assignee: The Firestone Tire & Rubber Company, Akron, Ohio

[21] Appl. No.: 179,596

[22] Filed: Aug. 19, 1980

[51] Int. Cl.³ .............................................. B60C 13/00
[52] U.S. Cl. .................................. 152/353 R; 156/75; 156/116; 428/31; 73/49; 116/34 A; 116/70; 116/207; 116/212; 116/216; 40/587; 301/37 ST
[58] Field of Search .......................... 156/75, 91, 116; 428/31; 152/DIG. 12, 353, 352 R, 352 A, 415; 73/49, 146, 146.2, 146.3, 146.4, 146.5, 146.8; 116/34 R, 34 A, 34 B, 70, 101, 206, 207, 212, 216, 333, DIG. 3; 40/587, 588, 591, 595–597; 301/5 B, 37 R, 37 ST, 37 TC, 37 B

[56] References Cited

U.S. PATENT DOCUMENTS

| | | | |
|---|---|---|---|
| 1,687,761 | 10/1928 | Hahn | 152/353 R |
| 1,784,118 | 12/1930 | Smithers | 152/353 R |
| 1,870,742 | 8/1932 | Pierce | 116/34 A |
| 2,654,337 | 10/1953 | Fidler | 116/34 A |
| 2,800,098 | 7/1957 | Crosby, Jr. | 152/353 R |
| 2,947,103 | 8/1960 | Kiashek | 40/140 |
| 3,128,815 | 4/1964 | Nonnamaker | 152/353 R |
| 3,164,192 | 1/1965 | Kasio et al. | 152/353 R |
| 3,258,050 | 6/1966 | Nonnamaker | 152/353 R |
| 3,481,652 | 12/1969 | Mazerolle | 301/37 |
| 3,511,541 | 5/1970 | Spisak | 301/37 |
| 3,578,055 | 5/1971 | French et al. | 152/330 R |
| 3,638,704 | 2/1972 | Boileau | 152/353 R |
| 3,663,328 | 5/1972 | Turoczi, Jr. | 152/353 R |
| 3,826,221 | 7/1974 | Ross | 116/216 |
| 4,019,368 | 4/1977 | Navato | 116/207 |
| 4,144,921 | 3/1979 | Yabuta et al. | 152/353 R |
| 4,198,774 | 4/1980 | Roberts et al. | 152/353 R |
| 4,212,339 | 7/1980 | Dobson | 152/330 L |

FOREIGN PATENT DOCUMENTS 146557 7/1936 Austria .
676548 11/1964 Italy ............................. 152/353 R

OTHER PUBLICATIONS

"MOT Journal, Auto", (Germany), Nov. 14, 1979, p. 101.
"Road and Track Magazine", Aug. 1980, p. 128.

Primary Examiner—Edward C. Kimlin
Assistant Examiner—Lois E. Boland
Attorney, Agent, or Firm—Ernst H. Ruf

[57] ABSTRACT

In the combination of detachable addition members with rubber articles, particularly tire sidewalls, wherein each article has a circumferentially discontinuous first coupling portion adapted to operatively interact with a second coupling portion on the addition member for securing the member to the article, the improvement being characterized in that either the coupling portions or addition members are adapted to produce a perceptive physical change during abnormal operating conditions of the article.

8 Claims, 20 Drawing Figures

FIG.4

TIRE SIDEWALL ADDITION MEMBERS THAT UNDERGO PERCEPTIBLE CHANGE DURING ABNORMAL OPERATION

CROSS-REFERENCE TO RELATED APPLICATION

The present invention represents an improvement over that shown, discussed and claimed in simultaneously filed and copending application Ser. No. 179,601, which is also assigned to the assignee of the present invention.

TECHNICAL FIELD

The field of art to which this invention pertains is that of addition members for molded rubber articles and more particularly for use on tire sidewalls for providing combinations of decorative, multi-colored, personalized, safety-enhancing as well as utilitarian and easily replaceable or changeable tire and sidewall trim combinations.

At the present time there continues to be an appreciable commercial demand for pneumatic tires having sidewalls or portions thereof of different color than the remainder of the tire. Normally tires have a black tread and sidewall but the provision of raised, generally white, letters or colored areas in the tire sidewalls has been in great demand by the public and is being provided by virtually all tire manufacturers. These decorative sidewalls are usually built integrally with the pneumatic tires by well known procedures. However, such decorative sidewall tires are not only costly to build and involve relatively expensive manufacturing procedures, but also may make use of pigments that are not always fully compatible with the remaining portions of the tire sidewall.

BACKGROUND ART

While efforts have previously been made to provide removable types of sidewall trim members that can be affixed in or to a pneumatic tire sidewall, it has been difficult to provide attractive pneumatic tire trim members that can be positively secured in place on, or in combination with, a pneumatic tire sidewall so as to remain in good operative engagement therewith over a long service life.

Previous effort to resolve these problems have included the use of removable sidewall or trim members wherein a radially inner edge or flange section is physically interlocked between the tire bead and the wheel flange when the tire is deflated and is being positioned on the wheel. Such sidewalls are objectionable because they are relatively difficult to mount and dismount. Other efforts have included the attempted securing of the tire sidewall to the tire and wheel assembly by means of a wheel cover or hub cap that attaches and engages with a radial inner portion of the sidewall to secure it in place.

Other prior art, exemplified by U.S. Pat. Nos. 3,128,815, 3,164,192 and 3,258,050 for example, utilizes annular flexible tire trim members that engage a sidewall of a tire via coupling means that include continuous annular grooves and lips on the sidewall members and the tire sidewalls. These circumferentially continuous coupling means may also utilize male or female coupling means on the tire sidewall to match a complementary female or male coupling means provided on the inner face of the sidewall covering. A recurring problem with this continuous type of coupling or retention means is that once disengagement is initiated at any one point, it will rapidly continue until the entire member is removed. In addition, even if but a portion of the sidewall member is damaged, it detracts from the appearance of the tire and the entire trim member must be replaced. Furthermore, individualized or personalized styling treatments, as may be desired by the end user, are generally not feasible.

DISCLOSURE OF THE INVENTION

The present invention provides an improvement over the previously-discussed removable sidewall trim members by utilizing a detachable tire sidewall addition member, having a visually exposed portion that is visible at all times, in combination with a pneumatic tire wherein the tire has a circumferentially discontinuous first coupling means portion adapted to operatively interact with a complementary second coupling means portion on the tire sidewall addition member for thereby securing the sidewall addition member to the tire sidewall.

Generally, a plurality of geometrically-shaped, detachable sidewall addition members is utilized wherein each addition member is provided with its own coupling means portion that is adapted to operatively interact with one of a plurality of independent and circumferentially discontinuous coupling means portions on the tire sidewall. Each coupling means portion is independent, localized and separate from each other coupling means portion, i.e., there is no one annular coupling or retention means in the tire sidewall that is circumferentially continuous relative to the annular extent of the sidewall and no continuous coupling or retention means on the addition member that can coact with more than one coupling means on the tire sidewall.

The exact location, on the tire sidewall, of the various addition members is both a matter of choice and/or function of the intended use of the addition members which may take the form of a great variety of geometric shapes, colors and textures. The addition members of the present invention may be coupled with the tire sidewall with any type of desired mechanical coupling means that will permit subsequent removal thereof, with one preferred type of coupling means taking the form of a recess or depression adjacent to a peripheral undercut which serves to yieldingly receive and thereafter snugly retain the peripheral portion of the addition member. If desired, the exposed surface of the addition member may be at an elevation that is the same as or differs from the surrounding surface of the rubber article.

Furthermore, the addition members of the present invention may be provided with an indicium. If so desired, at least a portion of the indicium may be of a color differing from the remainder of the addition member or the rubber article.

The sizes, shapes and thicknesses as well as the material compositions and elasticities of the addition members may also vary greatly depending on the intended use thereof.

Not only can the addition members be used to provide distinctive styling but also to permit unique personalized identification as well as permitting the use of reflective coatings thereon to enhance safety. Even tire branding information can be accomplished by the use of appropriate members. Furthermore, it may be possible to selectively weight the addition members to provide static and dynamic balancing features to the tire. It is also possible to so couple the addition members to the tire sidewall that they disengage at a particular load and/or tire inflation pressure. Specialized coatings can also be utilized to provide visual notification of possible tire damage or departure from normal operating conditions.

If abnormal operating conditions do occur or there is damage to the addition members via scuffing, for example, the addition members can readily be replaced since they are but detachably secured to the rubber article.

The use of the detachable addition members of the present invention not only permits almost limitless styling and/or utility and safety combinations but may also increase tire life while at the same time decreasing the cost of manufacture as well as permitting ready member replacement in the event of damage.

BEST MODE FOR CARRYING OUT THE INVENTION

Figure 1:
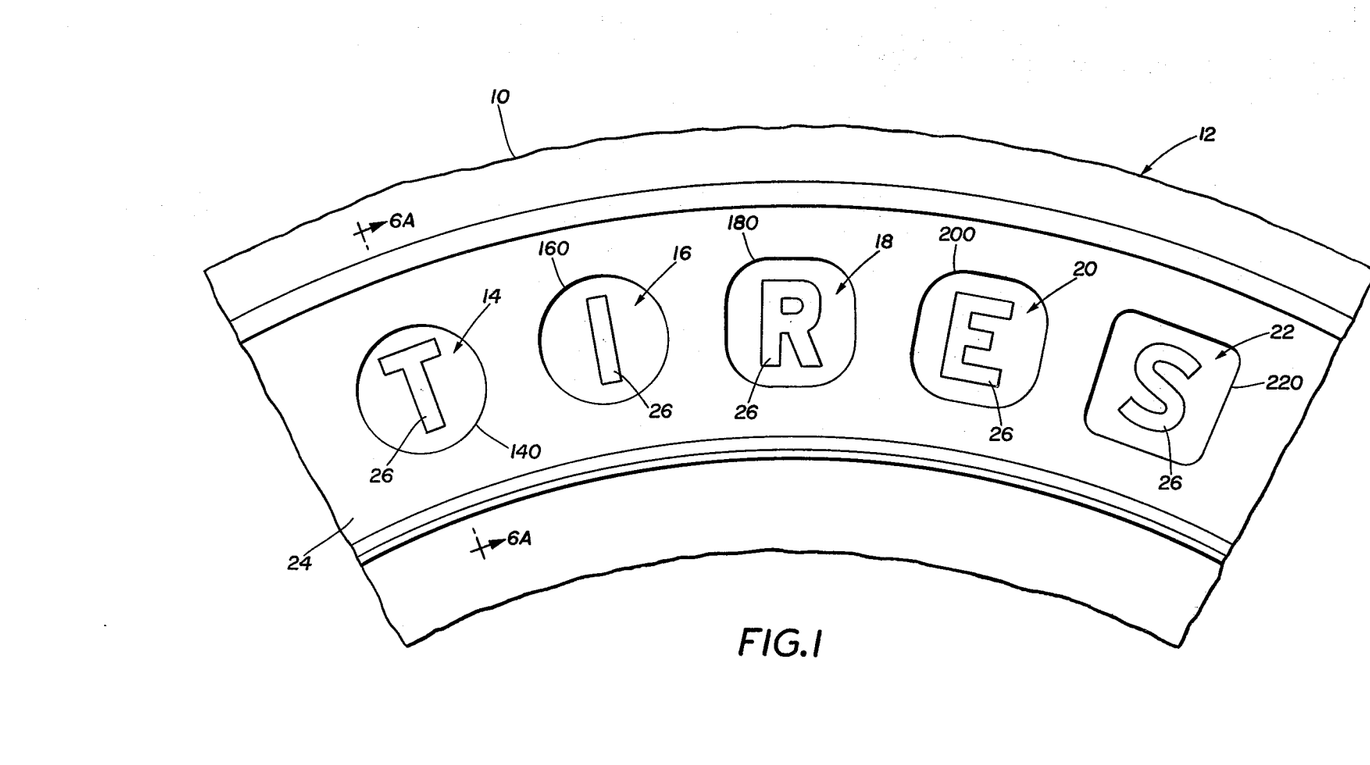
FIG. 1 is a fragmentary plan view of an article, such as the sidewall of a pneumatic tire for use on automobiles for example, illustrating several variations of the addition members of the present invention in their installed condition.

Referring now to the drawings, specifically FIG. 1, there is illustrated a fragmentary plan view of a rubber article 10, such as the sidewall 12 of a pneumatic tire for use on vehicles for example, illustrating several variations of addition members 14, 16, 18, 20 and 22 of the present invention in their installed condition. By the term "sidewall" of a tire is meant that area of the tire extending from the shoulder of the tire tread to the tire bead or rim flange area of the wheel upon which the tire is mounted. In addition, it is contemplated that the addition members of the present invention may also be utilized on one or both of the exposed sidewall surfaces of a tire.

Figure 2A:
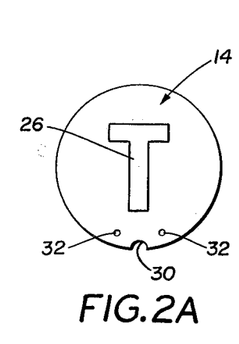
FIGS. 2A, 2B, 2C, 2D and 2E are plan views of the addition members of FIG. 1 in their uninstalled condition, illustrating possible shapes, configurations, indicia thereon and edge treatments of said members.
Figure 3A:
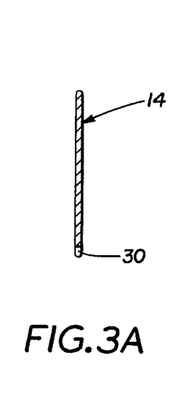
FIGS. 3A, 3B, 3C, 3D and 3E are vertical cross sections through the corresponding FIG. 2 configurations.
Figure 4:
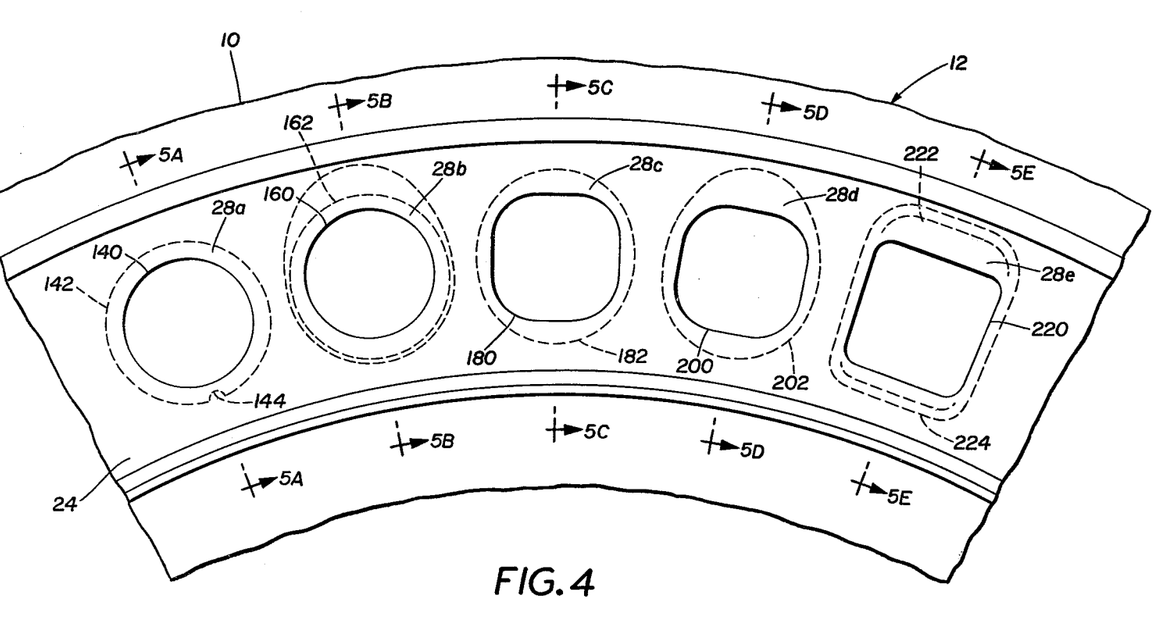
FIG. 4 is a fragmentary plan view, similar to that of FIG. 1, illustrating several shape variations of coupling means for receiving and retaining the addition members shown in FIG. 1 and FIGS. 2A through 2E.
Figures 5A, 5B, 5C:
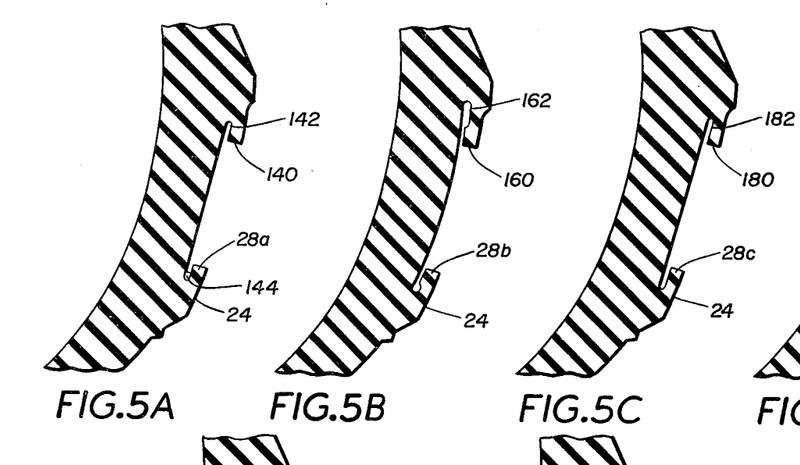
FIGS. 5A, 5B, 5C, 5D and 5E are vertical cross sections, taken along the lines 5A,5A; 5B,5B; 5C,5C; 5D,5D; and 5E,5E respectively of the coupling means illustrated in FIG. 4.
Figure 6A:
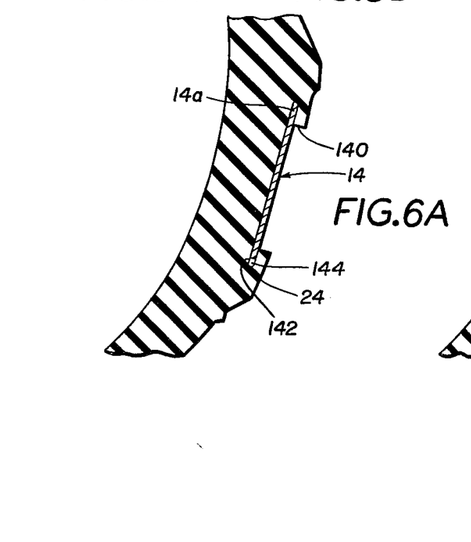
FIG. 6A is a vertical cross section taken along lines 6A—6A of FIG. 1 which illustrates that at least a portion of the exposed surface of the addition member is at an elevation less than the surrounding surface of said article.

For ease of understanding, and prior to proceeding with a very detailed description of the several embodiments invention, it may be best to note that in one embodiment thereof, member 14, shown in its installed condition in FIG. 1 is, for example, generally disc-shaped as shown in FIGS. 2A and 3A. Disc 14 is received and retained by any desired type of coupling means, a portion 28a of which is best shown in FIGS. 4 and 5A. Coupling means portion 28a includes a generally circular depression or pocket 140 of a diameter less than that of insert member 14 together with an adjacent annular peripheral undercut or circular groove 142. Pocket 140 and groove 142 are dimensioned and sized so as to yieldingly receive and thereafter snugly retain addition or insert member 14, preferably in an interference-fit condition, as best shown in FIG. 6A. It should be noted that if it is desired to inhibit the rotation of disc-shaped member 14, a small depression or keyway may be incorporated on the periphery of disc 14, with depression 30 being adapted to matingly engage with a post or key 144 in groove 142. A comparison of FIGS. 1, 2A and 6A will show that an annular peripheral portion 14a (FIG. 6A) of member 14, complementary with groove 142 serves as another coupling means portion which coacts with coupling means portion 28a for retaining member 14 on tire sidewall 12. If desired, annular portion 14a may be provided with a pair of spaced apertures 32 that permit the insertion of the jaw ends of an installation tool such as a pair of needle-nose pliers, for example. Such a tool may be used to temporarily elastically deform member 14 which assists in the addition thereof to tire sidewall 12.

Figure 2B:
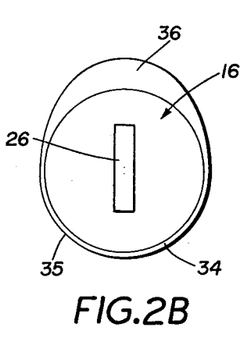
Figure 3B:
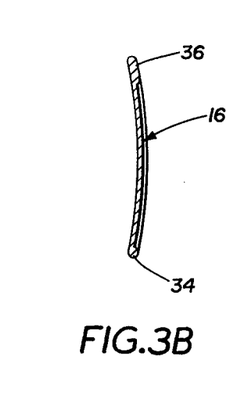

Returning now to FIG. 1, member 16, as best shown in FIGS. 2B and 3B, is slightly curved in cross section and provided with a thickened peripheral bead or lip edge 34, a semi-circular portion 35 of which is generally annular and an adjacent semi-circular portion 36 of which is generally elliptical. Coupling means portion 28b (FIGS. 4, 5B) coacts with lip edge 34 for securing member 16 to article 10, with coupling means 28b having a depression 160 smaller in diameter than that of insert member 16 and a thickened peripheral groove 162 complementary in shape to that of insert member lip edge or bead 34.

Figure 2C:
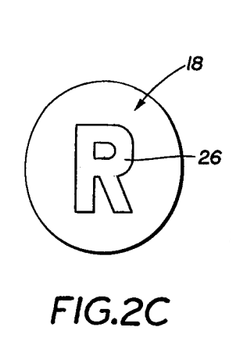
Figure 2D:
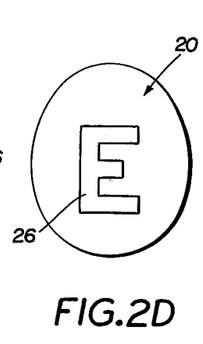
Figure 2E:
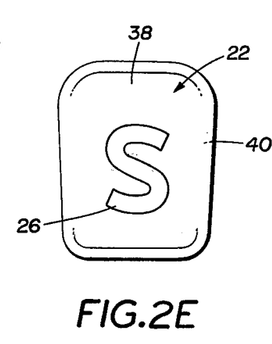
Figure 3C:
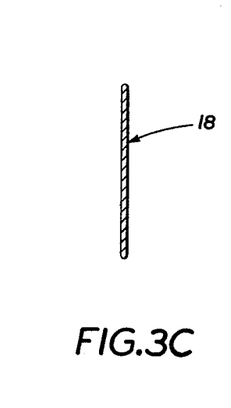

Turning now to FIGS. 2C and 3C, it will be noted that member 18 is basically flat in cross section, elliptical in shape and adapted to be yieldingly received and retained in article 10 via coupling means portion 28c, best shown in FIG. 4 and FIG. 5C. Coupling means portion 28c includes depression 180 and adjacent undercut or peripheral groove 182 which is generally elliptical in shape and coactive with the peripheral portion of member 18 complementary with groove 182. It should, however, be noted that the peripheral shape, i.e., the window or opening of depression 180 is neither circular nor elliptical but rather takes the shape of a rounded corner rectangle. Thus it should be clear that for any of the embodiments of the addition members of this invention, the shape of the depression of the coupling means portion in tire sidewall 12 may be concentric with or differ from the actual shape of the members themselves. A comparison of FIGS. 1, 2A through 2E and 4 should make this fact clear.

Figure 3D:
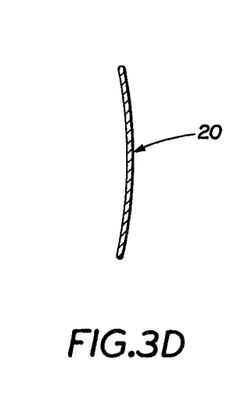
Figures 5D, 5E:
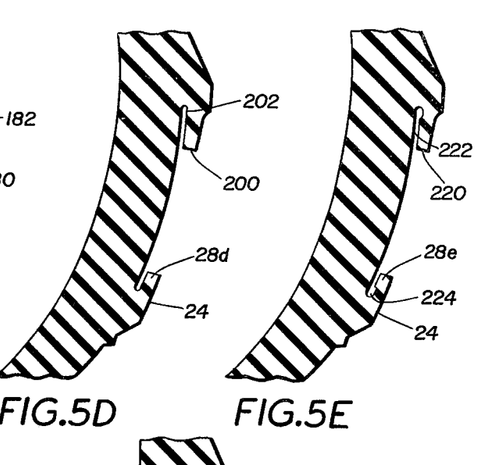

Turning now to FIGS. 2D and 3D, member 20 is slightly curved in cross section while at the same time being generally egg-shaped. Coupling means portion 28d, best shown in FIGS. 4 and 5D, includes depression 200 and an adjoining undercut 202 which is also generally egg-shaped and coactive with the peripheral portion of member 20 complementary with undercut 202. The peripheral shape of depression 200 takes the form of a rounded corner rectangle simliar to that of depression 180 of coupling means 28c.

Figure 3E:
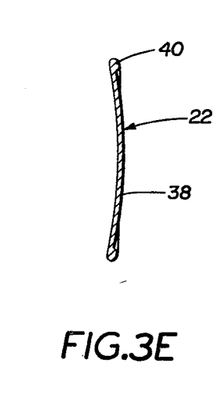

Turning now to FIGS. 2E and 3E, member 22, which is slightly curved in cross section, takes the form of a quadrilateral having rounded or radiused corners, or more specifically a rounded-corner isosceles trapezoid 38 having a shape-conforming peripheral bead or lip 40 of greater thickness. Coupling means portion 28e, best shown in FIG. 4 and FIG. 5E, which has a shape complementary to member 22, includes depression 220 and an adjacent peripheral undercut 222 having a bead-receiving peripheral portion 224. Bead 40 and bead portion 224 coact to secure member 22 to article 10.

Turning now to FIG. 6A, which is a vertical cross section taken along the lines 6A—6A of FIG. 1, there is illustrated that at least a portion of the exposed surface of member 14 is at an elevation less than the surrounding surface 24 of sidewall 12. Similarly, FIG. 6B, which presents a view similar to that of FIG. 6A, illustrates that at least a portion of the exposed surface of a member 14' is at substantially the same elevation as the surrounding article surface 24. FIG. 6C, which again is a figure similar to that of FIG. 6A, illustrates that at least a portion 42 of the exposed surface of member 14" is at an elevation greater than the surrounding article surface 24. If desired, portion 42 could have a peripheral dimension greater than that of pocket or window 140.

Figure 6B:
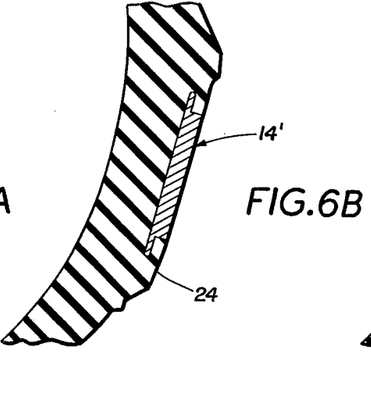
FIG. 6B is a vertical cross section similar to that of FIG. 6A wherein at least a portion of the exposed surface of said addition member is at the same elevation as the surrounding surface of said article.
Figure 6C:
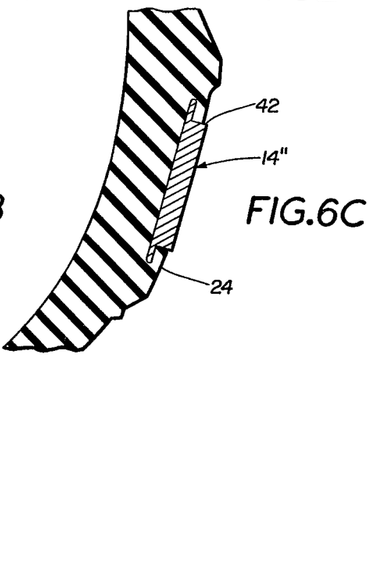
FIG. 6C is a vertical cross section similar to that of FIG. 6A wherein at least a portion of the exposed surface of said addition member is at an elevation greater than the surrounding surface of said article.

It should also be understood that if indicia, as represented by letters and identified by numeral 26 on the several members, are utilized, they or at least portions thereof can also be at an elevation that is less than, the same as, or greater than the surrounding surface of the addition member, 14, 14' and 14" in a manner similar to that shown in FIGS. 6A, B and C, respectively. The term "indicia" as used herein includes numerals and letters as well as any type of character, symbol, mark or designation used for the purpose of decoration, information or communication.

The exact location, on the tire sidewall, of the various addition members is a matter of both choice and/or function depending on the intended use of the addition members, i.e.,—decoration-styling-safety-balancing-identification, etc.

Figures 7, 8A, 8B:
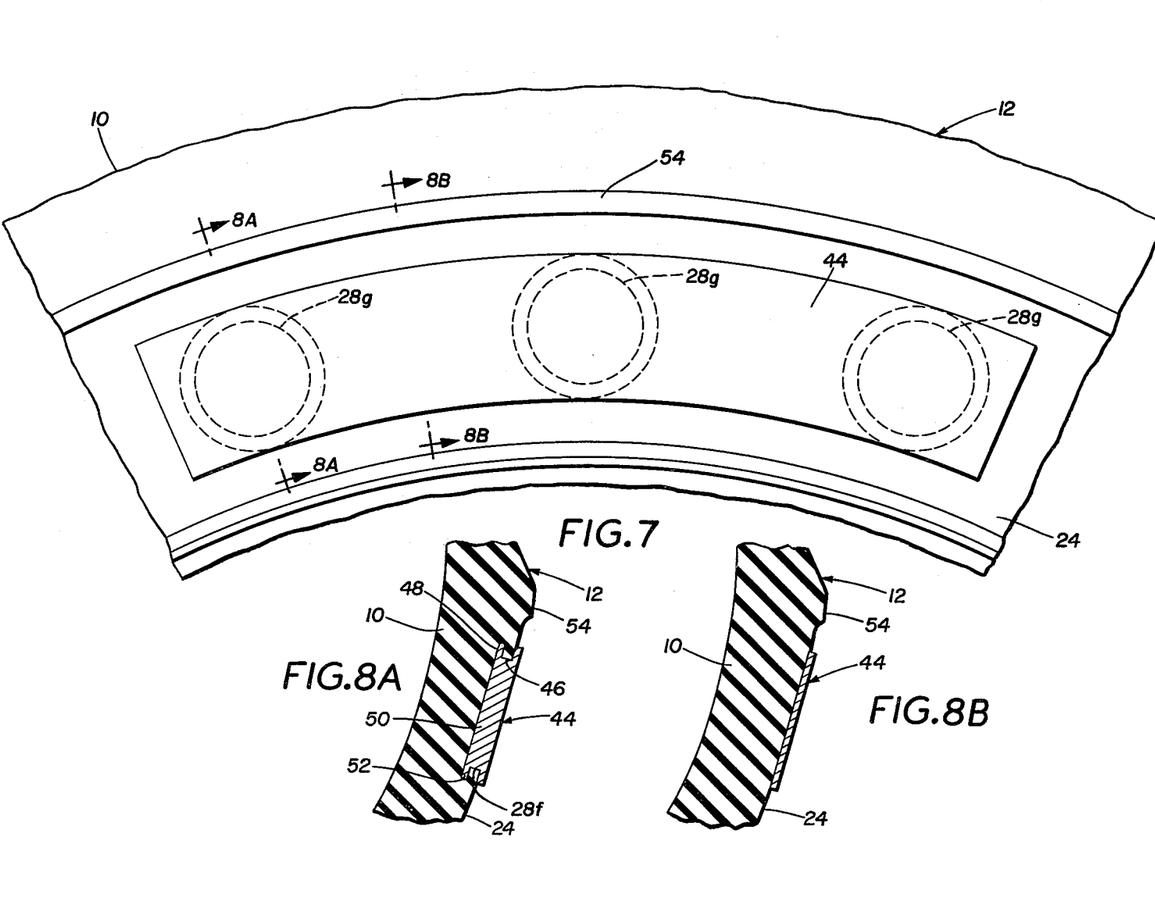

The sizes, shapes and thicknesses, as well as material compositions and elasticities of the addition members again may also vary greatly. For example, addition members of generally circular configuration, made of metal, plastic, elastomeric and rubbery materials ranging in thickness from 0.010 to 0.050 inches in cross sectional thickness have been produced and tested. Thus the addition member may be either rigid or flexible but must be elastic and preferably is more elastic than the tire sidewall material itself. Further to being flat or slightly curved in cross section, the addition members may also be compound curved or hemispherically shaped in cross section, the latter aiding in the retention thereof through residual compression forces induced via the interference fit of the addition member within the tire sidewall coupling means portion. It is also possible when using elastomeric or rubbery materials, to embed, adhere or add a flexible reinforcing member, such as a metal wire, near the periphery or margins of the addition members, for reinforcing such members in such areas to enhance retention in the sidewalls. In order to reduce damage from curb scuffing and to minimize accidental dislodging of the addition members, it may be desirable to add an annular scuffing ring 54 (FIG. 7) on the tire sidewall in close proximity and preferably radially outwardly of any of the addition members of this invention.

It is envisioned in one application, that at least the exposed side of the tire outer sidewalls be provided with at least one but more likely a plurality of preferably equally circumferentially spaced first coupling means portions of any of types 28a to 28f herein previously described. Upon sale of such a tire to an end user, the tire sidewall can then be personalized by the addition of pluralities of the addition members of the present invention having any desired indicia thereon. Any unused coupling means portions can either be left as is or provided with flush addition members of the same color and texture of the remainder of the sidewall in the manner similar to that shown in FIG. 6B, for example.

It should be clear at this time that the addition members of this invention could include a great variety of geometric shapes, including but not limited to circles, elipses, squares, triangles and diamonds as well as any desired combinations of same. One preferred type of coupling means portion takes the form of a recessed depression or pocket together with an adjacent peripheral undercut of the type shown in FIGS. 5A through 5E, wherein addition members 14, 16, 18, 20 and 22 basically become insert members that are retained on their peripheries or margins. Sidewall coupling means portions such as 28a–28f are readily achieved by adding correspondingly shaped posts to the tire molds at the time of manufacture. As previously noted, if the addition member is circular, an anti-rotation device is required if, for example, member 14 is provided with a decorative or indicia bearing display surface that is direction sensitive. Other shapes, including those shown in FIGS. 2B through 2E, are inherently non-rotatable if snugly fitted into a corresponding coupling means of the type previously described.

The tire sidewall addition members of the present invention may be coupled with the tire sidewall with any type of desired mechanical coupling means that will permit subsequent removal thereof. Such coupling means may also include but are not limited to the male or female coupling means disclosed in U.S. Pat. No. 3,164,192 to Kasio, et al. and the mechanical interlocking via grooves and lips etc. shown in U.S. Pat. No. 3,128,815 to Nonnamaker. It is also foreseen that the addition members can be manufactured with male/-female post and stake couplings or with mating interlocking backings of the hook and loop type similar to those manufactured by Velcro U.S.A., Inc. of New York, NY.

As already noted, the sidewall addition members may be placed anywhere along the radial extent of the tire sidewall and preferably are used in pluralities around the annular extent of the sidewall and, regardless of the type of coupling means, may be at elevations less than, the same as, or greater than the surrounding surface.

The addition members may be of the same or of a color differing from the sidewall and/or the remainder of the tire and may also be designed to provide distinctive, unique personalized styling. For example, the addition members may be coded or printed to provide manufacturer or brand name, user or personalized identification. If desired, indicia, such as in the form of letters or numbers, of various colors and color combinations etc. may be uniquely assembled to fit the desires of the particular end user. The addition members may be reflective, irridescent or phosphorescent coated in order to provide reflective safety features. Electronic sheet material having reflex-reflective elements embedded therein is set forth in U.S. Pat. No. 3,449,201.

It is envisioned that both the inner and outer exposed sidewall surfaces of a tire can be provided with sidewall addition members and that, for example, the addition members may be selectively weighted to provide static and dynamic balancing features to the tire. This is preferably accomplished on the inner exposed sidewall surface.

The addition members may also be coupled to the tire sidewall in such a manner that they disengage at a particular load and/or tire inflation pressure, e.g., such as during vehicle overloading, low inflation or other abnormal operating conditions so as to provide visual notification of possible tire damage or departure from normal operating conditions. It is also conceivable that at least a portion of the coupling means, for example, the area of the tire sidewall immediately to the rear of the addition member be provided with a color differing from the sidewall so as to provide a very definite visual notification that the tire may have undergone abnormal operating conditions resulting in the disengagement of one or more of the addition members. For instance a special addition member can be located on the tire sidewall, separately from plurality of purely decorative addition members for example, with this special member being adapted to produce an audible or visual warning of abnormal operating conditions. One such special member can be adapted to give audible warning by undergoing elastic deformation as the tire, when underinflated, goes through its footprint, where "footprint" refers to that portion of a tire that is in contact with the road surface at any one time. A properly calibrated Belleville spring, for example, will undergo elastic deformation and provide an audible signal while being thereby deformed.

Another embodiment of the present invention envisions that the addition members be made from or coated with materials that change color or patterns under stress or which mask a varied color pattern backing to provide visual notification of improper tire inflation. A multilayer pearlescent-type coating that changes color under stress is obtainable from the Mearl Corporation of Peekskill, New York.

In a similar manner, heat sensitive coatings can be used on the visually-exposed portions of the addition members to indicate overheating, for example, by means of a change of color or pattern. Coatings of this type are manufactured by the Telatemp Corporation of Fullerton, Cal.

From the foregoing description, it is believed that those familiar with the art will readily recognize and appreciate the novel concepts and features of the present invention. Obviously, while the invention has been described in relation to but a limited number of embodiments, numerous further variations, changes, substitutions and equivalents will present themselves to persons skilled in the art and may be made without necessarily departing from the scope and principles of the invention, with the latter being determined solely by reference to the claims appended hereto.

I claim:

1. In the combination of a pneumatic tire with a detachable and circumferentially discontinuous tire sidewall addition member, having a visually exposed portion that is visible at all times, wherein said tire has a circumferentially discontinuous first coupling means portion adapted to operatively interact with a second circumferentially continuous coupling means portion on said sidewall addition member for securing said member to said tire sidewall wherein the improvement comprises one of said addition member and coupling means portions including means for producing a perceptive physical change during abnormal operating conditions of said tire.

2. The improved combination of claim 1 wherein said coupling means is adapted to disengage during said abnormal operating conditions so as to provide notification of possible tire damage.

3. The improved combination of claims 1 or 2 wherein said coupling means is adapted to disengage during low inflation pressures so as to provide notification of possible tire damage.

4. The improved combination of claims 1 or 2 wherein said coupling means is adapted to disengage during overloading of said tire so as to provide notification of possible tire damage.

5. The improved combination of claim 1 wherein at least a part of the visually exposed portion of said addition member includes the use of a material which changes appearance under stress.

6. The improved combination of claim 1 wherein at least a part of the visually exposed portion of said addition member includes the use of a material which irreversibly changes color when the tire is overheated.

7. The improved combination of claim 1 wherein at least a part of the visually exposed portion of said addition member undergoes a permanent visual change during abnormal operating conditions of said tire so as to provide a visual indication thereof.

8. The improved combination of claim 1 wherein said addition member is constructed to produce an audible warning during abnormal operating conditions of said tire.

* * * * *

UNITED STATES PATENT AND TRADEMARK OFFICE
CERTIFICATE OF CORRECTION

PATENT NO. : 4,318,436
DATED : March 9, 1982
INVENTOR(S) : Louis W. Shurman

It is certified that error appears in the above-identified patent and that said Letters Patent are hereby corrected as shown below:

Delete Sheet 5 of the drawings.

Column 6, line 2, delete "54".

Column 6, line 3, delete "(FIG. 7)".

Signed and Sealed this

Twenty-fifth Day of May 1982

[SEAL]

Attest:

*Attesting Officer*

GERALD J. MOSSINGHOFF

*Commissioner of Patents and Trademarks*